US012654222B2

(12) United States Patent
Yatsukura et al.

(10) Patent No.: US 12,654,222 B2
(45) Date of Patent: *Jun. 16, 2026

(54) ALUMINUM ALLOY MOLDED BODY AND PRODUCTION METHOD THEREFOR

(71) Applicants: NIPPON LIGHT METAL COMPANY, LTD., Tokyo (JP); TOYO ALUMINIUM KABUSHIKI KAISHA, Osaka (JP)

(72) Inventors: Masato Yatsukura, Tokyo (JP); Takashi Nagao, Shizuoka (JP); Tsuguharu Tashiro, Shizuoka (JP); Jun Kusui, Osaka (JP)

(73) Assignees: NIPPON LIGHT METAL COMPANY, LTD., Tokyo (JP); TOYO ALUMINIUM KABUSHIKI KAISHA, Osaka (JP)

( * ) Notice: Subject to any disclaimer, the term of this patent is extended or adjusted under 35 U.S.C. 154(b) by 614 days.

This patent is subject to a terminal disclaimer.

(21) Appl. No.: 17/919,811

(22) PCT Filed: Apr. 13, 2021

(86) PCT No.: PCT/JP2021/015326
§ 371 (c)(1),
(2) Date: Oct. 19, 2022

(87) PCT Pub. No.: WO2021/215305
PCT Pub. Date: Oct. 28, 2021

(65) Prior Publication Data
US 2023/0158570 A1      May 25, 2023

(30) Foreign Application Priority Data

Apr. 21, 2020      (JP) ................................. 2020-075736

(51) Int. Cl.
*B22F 1/00* (2022.01)
*B22F 1/05* (2022.01)
(Continued)

(52) U.S. Cl.
CPC .................. *B22F 1/00* (2013.01); *B22F 1/05* (2022.01); *B22F 10/28* (2021.01); *B22F 10/64* (2021.01);
(Continued)

(58) Field of Classification Search
CPC .. B22F 1/00; B22F 10/28; B22F 10/64; B22F 1/05; B22F 2201/10; B22F 2301/052;
(Continued)

(56) References Cited

U.S. PATENT DOCUMENTS

2014/0271322 A1* 9/2014 Godfrey ................. B22F 10/28
419/25
2020/0056268 A1* 2/2020 Heard ..................... C22C 21/00
(Continued)

*Primary Examiner* — John A Hevey
(74) *Attorney, Agent, or Firm* — RANKIN, HILL & CLARK LLP

(57) ABSTRACT

The purpose of the present invention is to provide an aluminum alloy molded body that has excellent thermal stability and does not contain a rare earth element, and to provide a production method for the same. More specifically, the present invention provides an aluminum alloy molded body that has a high degree of hardness even at 200° C., and a method which enables efficient production of the same even if the aluminum alloy molded body has a complicated shape. An aluminum alloy laminated molded body according to the present invention, which is molded using an additive manufacturing method, is characterized in that: the raw material therefor is an aluminum alloy material containing 2-10 mass % of a transition metal element that forms a eutectic crystal with Al, with the remainder being Al and unavoidable impurities; the relative density thereof is at least 98.5%; a metal structure is composed of a primary crystal α

(Continued)

2

(Al) and a compound composed of Al and the transition metal element; and the spacing of the compound in a region excluding the boundary of a melt pool is no more than 200 nm.

7 Claims, 3 Drawing Sheets

(51) Int. Cl.

| | |
|---|---|
| *B22F 10/28* | (2021.01) |
| *B22F 10/64* | (2021.01) |
| *B33Y 10/00* | (2015.01) |
| *B33Y 40/20* | (2020.01) |
| *B33Y 70/00* | (2020.01) |
| *B33Y 80/00* | (2015.01) |
| *C22C 21/00* | (2006.01) |

(52) U.S. Cl.
CPC .............. *B33Y 10/00* (2014.12); *B33Y 40/20* (2020.01); *B33Y 70/00* (2014.12); *B33Y 80/00* (2014.12); *C22C 21/00* (2013.01); *B22F 2201/10* (2013.01); *B22F 2301/052* (2013.01); *B22F 2304/10* (2013.01); *B22F 2998/10* (2013.01)

(58) Field of Classification Search
CPC .. B22F 2304/10; B22F 2998/10; B22F 10/25; B22F 10/38; B33Y 10/00; B33Y 40/20; B33Y 70/00; B33Y 80/00; C22C 21/00; C22C 1/0416; Y02P 10/25
See application file for complete search history.

(56) References Cited

U.S. PATENT DOCUMENTS

2021/0178474 A1* 6/2021 Zindel ..................... B22F 10/28
2024/0035122 A1* 2/2024 Yatsukura .............. B22F 10/64

\* cited by examiner

ALUMINUM ALLOY MOLDED BODY AND PRODUCTION METHOD THEREFOR

TECHNICAL FIELD

The present invention relates to an aluminum alloy molded body and a method for producing the same, and more specifically, relates to an aluminum alloy laminated molded body that can be suitably used as a member that is required to have both excellent thermal stability and high thermal conductivity and an efficient production method therefor.

PRIOR ARTS

Al—Fe-based aluminum alloys have high specific strength and excellent thermal conductivity, and in addition thereto have good recyclability, so they are expected to be used in a wide range of applications, including transportation equipment such as electric vehicles and aircraft, and heat sink materials for LED lighting, and various types of electronic electric equipment.

Under such circumstances, various studies have been made to improve the strength and thermal conductivity of the Al—Fe-based aluminum alloys. For example, in Patent Literature 1 (Japanese Unexamined Patent Publication No. 2013-204087), there are disclosed an aluminum alloy member having high strength such that the tensile strength is 200 MPa or more at room temperature and a thermal conductivity of 145 W/K·m or more is characterized in that it includes 8 mass % (hereinafter %)<Si<11%, 0.2%<Mg<0.3%, 0.3%<Fe<0.7%, 0.15%<Mn<0.35%, 1<Fe+Mn×2, 0.005%<Sr<0.020%, Cu<0.2%, Zn<0.2%. and balance being Al and unavoidable impurities, and that it is kept at 200° C.<T<250° C. for 0.1 to 1 hour after casting and a production method therefor.

In the aluminum alloy member and the production method therefor described in Patent Literature 1, it is said that it has been found that the member shows the tensile strength at room temperature of as high as 200 MPa or more and the thermal conductivity of as high as 145 W/mK or more by ensuring the fluidity and improving the seizure prevention by optimizing the alloy composition containing impurities, and by shortening the heat treatment time by improving the thermal conductivity due to eutectic Si granulation after casting.

Further, in Patent Literature 2 (Japanese Unexamined Patent Publication No. 2015-127449), there is disclosed an aluminum alloy sheet material for high molding comprises, by mass %, Si:0.15% or less, Fe:1.00 to 1.60%, Ti:0.005 to 0.02%, Zr:0.0005 to 0.03%, and optionally Mn:0.01 to 0.50%, with the balance being Al and unavoidable impurities, and has the average crystal grain size of 25 μm or less.

In the aluminum alloy sheet material for high molding described in Patent Literature 2, it is said that, since the average crystal grain size is 25 μm or less with the contents of Si, Fe, Ti, and Zr in the preferable ranges, it is possible to obtain an aluminum alloy sheet material for high molding having high elongation value and excellent high formability, and in addition, with necessary tensile strength and proof stress and also excellent thermal conductivity.

Further, in Patent Literature 3 (Japanese Unexamined Patent Publication No. 2020-33598), there is disclosed an Al—Fe—Er-based aluminum alloy characterized in that it contains Fe and Er, the balance being Al and unavoidable impurities, wherein Fe is about 5% by weight to about 15% by weight, and Er is about 0.2% by weight to about 1.2% by weight.

In the Al—Fe—Er-based aluminum alloy described in Patent Literature 3, it is said that, when adding about 0.2% by weight to about 1.2% by weight of Er, there is an effect that the impurities are removed and Al is used to form an L12 precipitate and to improve the quality of the melt by enhancing the effect of promoting precipitation. As a result, it is possible to provide an Al—Fe—Er-based aluminum alloy having excellent thermal stability and plasticity.

CITATION LIST

Patent Literature

Patent Literature 1: Japanese Patent Unexamined Publication No. 2013-204087
Patent Literature 2: Japanese Patent Unexamined Publication No. 2015-127449
Patent Literature 3: Japanese Patent Unexamined Publication No. 2020-33598

SUMMARY OF THE INVENTION

Technical Problem

The members made of the Al—Fe-based aluminum alloys are often used in a high temperature state, and the Al—Fe-based aluminum alloys are also expected to have thermal stability. However, thermal stability is not taken into consideration in the aluminum alloy member of Patent Literature 1 and the aluminum alloy sheet material for high molding of Patent Literature 2.

Further, although the Al—Fe—Er-based aluminum alloy described in Patent Literature 3 has one of the purposes of imparting thermal stability, in addition to being expensive due to the addition of Er, which is a rare earth element, the recyclability of the Al—Fe-based aluminum alloy is also reduced.

In view of the above problems in the prior art, an object of the present invention is to provide an aluminum alloy molded body that has excellent thermal stability and does not contain a rare earth element, and to provide a production method for the same. More specifically, the present invention provides an aluminum alloy molded body that has a high degree of hardness even at 200° C., and a method which enables efficient production of the same even if the aluminum alloy molded body has a complicated shape.

Solution to Problem

As a result of the intensive study on an aluminum alloy molded body and a method for producing the same in order to achieve the above object, the present inventors have found that it is extremely effective to obtain an aluminum alloy laminated molded body, which is molded by an additive manufacturing method, where an aluminum alloy material containing an appropriate amount of a transition metal element forming a eutectic crystal with Al is used as a raw material, and have reached the present invention.

Namely, the present invention provides an aluminum alloy molded body, which is an aluminum alloy laminated molded body molded by an additive manufacturing method,

3 which is characterized in that:

a raw material therefor is an aluminum alloy material containing 2 to 10% by mass of a transition metal element that forms a eutectic crystal with Al, with the remainder being Al and unavoidable impurities;

a relative density thereof is 98.5% or more;

a metal structure is composed of a primary crystal α (A) and a compound composed of Al and the transition metal element; and a distance of the compounds in a region excluding the boundary of a melt pool is 200 nm or less.

In the aluminum alloy molded body of the present invention, it is preferable that the transition metal element is Fe and the compound is an AlFe-based compound, but the transition metal element is not particularly limited as long as the effect of the present invention is not impaired, and various conventionally known transition metal elements can be used. Examples of the transition metal element other than Fe include Ni and Co. Hereinafter, the case where the transition metal element is Fe will be mainly described.

When quenching and solidifying an aluminum alloy material containing 2 to 10% by mass of Fe by an additive manufacturing method, a large amount of fine AlFe-based compounds are dispersed in the aluminum alloy molded body of the present invention, and the distance between the AlFe-based compounds in a region excluding the boundary of a melt pool is 200 nm or less. As a result, the movement of dislocations is suppressed and the effect is maintained up to a high temperature, so that the aluminum alloy molded body of the present invention has little deterioration in mechanical properties at a high temperature and has excellent thermal stability. The average particle size of the AlFe-based compound is preferably 20 to 100 nm. Here, the boundary region of the melt pool means a region where the distance from the boundary of the melt pool is up to 5 μm.

Further, the aluminum alloy molded body of the present invention is molded by an additive manufacturing method, and can be an arbitrary shape such as a complicated shape, or a hollow structure. Further, the relative density is 98.5% or more. The shape and size of the aluminum alloy material may be appropriately selected according to the additive manufacturing method to be used, and a powdered aluminum alloy material or a wire-shaped aluminum alloy material can be preferably used.

Further, since the aluminum alloy molded body of the present invention is obtained by an additive manufacturing method and is formed by joining many quenched and solidified regions, in the molded body, as a whole, a distribution of the elements is more uniform than that of a casting or the like. As a result, extremely fine AlFe-based compounds are uniformly dispersed in a large amount throughout the aluminum alloy molded body.

Examples of the unavoidable impurities in the aluminum alloy molded body of the present invention include Si, Cu, Mn, Mg, Zn, Cr and Ti.

Further, in the aluminum alloy molded body of the present invention, it is preferable that a Vickers hardness at 200° C. is 60 HV or more. When having the Vickers hardness of 60 HV or more at 200° C., it can be suitably used for applications such as engine pistons, turbo impellers and heat sink materials that are maintained at a high temperature. In addition, cooling performance may be required for the engine pistons, and it is preferable to use a high-temperature, high-strength material with high thermal conductivity. Here, more preferable hardness at 200° C. is 70 HV or more, and the most preferable hardness is 80 HV or more.

Further, in the aluminum alloy molded body of the present invention, it is preferable that a tensile strength at room temperature is 240 MPa or more. More preferable tensile strength is 250 MPa or more, and the most preferable tensile strength is 260 MPa or more. Since extremely fine AlFe-based compounds are uniformly and widely dispersed, the aluminum alloy molded body of the present invention has high tensile properties. Since the aluminum alloy molded body has these tensile properties, it can be suitably used in applications where strength and reliability are required.

In the aluminum alloy molded body of the present invention, it is preferable that a thermal conductivity is 100 W/mK or more. In the aluminum alloy molded body of the present invention, since Fe forms a fine AlFe-based compound, the amount of solid solution of Fe is reduced to increase the strength and thermal conductivity. In addition, the strain of the aluminum base material is significantly reduced in the process of forming the AlFe-based compound, and thus, the high thermal conductivity is realized by these effects.

Further, the present invention also provides a method for producing an aluminum alloy molded body, which is characterized by including, a lamination molding step of molding an aluminum alloy material containing 2 to 10% by mass of a transition metal element which forms a eutectic crystal with Al, with the remainder being Al and unavoidable impurities by an additive manufacturing method to obtain an aluminum alloy laminated molded body; and a heat treatment step of holding the aluminum alloy laminated molded body at 200 to 400° C. to precipitate a compound composed of Al and the transition metal element and to reduce residual stress.

In the method for producing the aluminum alloy molded body of the present invention, it is preferable that the transition metal element is Fe and the compound is an AlFe-based compound, but the transition metal element is not particularly limited as long as the effect of the present invention is not impaired, and various conventionally known transition metal elements can be used. Examples of the transition metal element other than Fe include Ni and Co. Hereinafter, the case where the transition metal element is Fe will be mainly described.

When molding an aluminum alloy material containing 2 to 10% by mass of Fe by an additive manufacturing method, a quenched and solidified structure made of an aluminum base material in which the Fe is solid-dissolved is formed, and then when maintaining the temperature at 200 to 400° C., it is possible to precipitate the AlFe-based compound further and to reduce the residual stress. When setting the heat treatment temperature to 200° C. or higher, a large amount of fine AlFe-based compounds are precipitated, and the distance between the AlFe-based compounds can be set to 200 nm or less. Further, when setting the heat treatment temperature to 400° C. or lower, it is possible to suppress coarsening of the AlFe-based compound and prevent reducing of mechanical properties such as Vickers hardness of the aluminum alloy molded body.

For example, when the Fe content is about 2.5% by mass, the Vickers hardness is increased by performing the heat treatment at 200 to 400° C. for 1 hour, and the Vickers hardness can be 70 HV or more. Further, the thermal conductivity can be improved by the heat treatment.

Further, the additive manufacturing method is not particularly limited as long as the effect of the present invention is not impaired, and various conventionally known additive manufacturing methods can be used. The additive manufacturing method is a method capable of obtaining a molded body having a desired shape by depositing a raw metal, and examples thereof include a powder bed melt-bonding method and a directed energy deposition method. Further, the heat source for melting the raw metal is not particularly limited as long as the effect of the present invention is not impaired, and various conventionally known heat sources can be used, and for example, a laser or an electron beam can be preferably used.

Effects of the Invention

According to the present invention, it is possible to provide the aluminum alloy molded body that has excellent thermal stability and does not contain a rare earth element, and to provide a production method for the same. More specifically, it is possible to provide an aluminum alloy molded body that has a high degree of hardness even at 200° C., and a method which enables efficient production of the same even if the aluminum alloy molded body has a complicated shape.

EMBODIMENTS FOR ACHIEVING THE INVENTION

Hereinafter, representative embodiments of the aluminum alloy molded body, and the producing method thereof according to the present invention will be described in detail with reference to the drawings, but the present invention is not limited to only these examples. Further, the elements in the embodiment can be optionally combined with a part or the whole. In the following description, the same or equivalent parts are denoted by the same numerals, and there is a case that redundant explanation may be omitted. In addition, since the drawings are for conceptually explaining the present invention, dimensions of the respective constituent elements expressed and ratios thereof may be different from actual ones.

1. Aluminum Alloy Molded Body

The aluminum alloy molded body of the present invention is an aluminum alloy laminated molded body molded by an additive manufacturing method, and is characterized in that: a raw material therefor is an aluminum alloy material containing 2 to 10% by mass of a transition metal element that forms a eutectic crystal with Al, with the remainder being Al and unavoidable impurities; and a distance between the compounds composed of Al and the transition metal element in a region excluding the boundary of a melt pool is 200 nm or less. Hereinafter, the composition, structure and various physical properties of the aluminum alloy molded body will be described in detail.

(1) Composition

The raw material of the aluminum alloy molded body of the present invention is the aluminum alloy material containing 2 to 10% by mass of a transition metal element that forms a eutectic crystal with Al, with the remainder being Al and unavoidable impurities. Hereinafter, the component elements will be described.

<Transition Metal Element>

Fe: 2 to 10% by mass

When containing 2% by mass or more of Fe, it is possible to increase the strength and hardness of the aluminum alloy molded body and improve the thermal stability due to formation of the AlFe-based compound. Further, when setting the Fe content to 10% by mass or less, it is possible to suppress the reduction of toughness, ductility and thermal conductivity of the aluminum alloy molded body caused by the coarsening of the AlFe-based compound, and also suppress the reduction of strength and hardness caused by the coarsening of the AlFe-based compound. The Fe content is preferably 3 to 9% by mass, more preferably 4 to 8% by mass.

The transition metal element is not particularly limited as long as the effect of the present invention is not impaired, and various conventionally known transition metal elements can be used. Examples of the transition metal element other than Fe include Ni, Co, and the like.

Examples of unavoidable impurities in the aluminum alloy molded body of the present invention include Si, Cu, Mn, Mg, Zn, Cr and Ti. Rare earth elements are positively excluded.

(2) Structure

Figure 1:
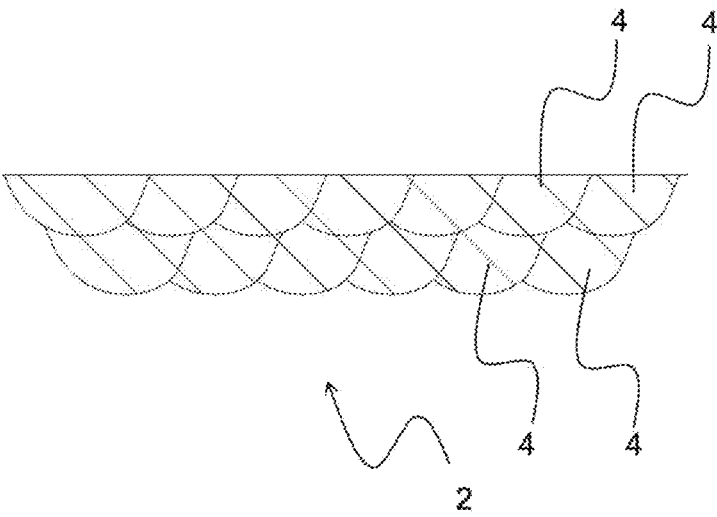
FIG. 1 is a schematic diagram of the cross-sectional macrostructure of the aluminum alloy molded body of the present invention.

FIG. 1 schematically shows the cross-sectional macrostructure of the aluminum alloy molded body of the present invention. Hereinafter, the case where the transition metal element is Fe will be described in detail. The aluminum alloy molded body 2 of the present invention is formed by the additive manufacturing method, and has a macrostructure in which a plurality of melt pools 4 are joined.

The number of melt pools 4 in the vertical and horizontal directions of the aluminum alloy molded body 2 is not particularly limited as long as the effect of the present invention is not impaired, and the aluminum alloy molded body 2 may be appropriately adjusted to have a desired size and shape.

Further, the size and shape of the melt pool 4 are not particularly limited, but as the melt pool 4 becomes larger, the cooling rate at the time of solidification decreases. That is, from the viewpoint of refining the crystal grains of the aluminum alloy molded body 2 and miniaturizing the AlFe-based compound, it is preferable to reduce the size of the melt pool 4 so that the cooling rate increases. Further, reduction of the size of the melt pool 4 itself can increase the strength of the aluminum alloy molded body 2 and homogenize the aluminum alloy molded body 2. On the other hand, when the melt pool 4 is made too small, the number of melt pools 4 required for forming the aluminum alloy molded body 2 increases, and therefore, from the viewpoint of production efficiency, it is preferable to increase the size of the melt pool 4, as long as the AlFe-based compound is sufficiently miniaturized.

The fine AlFe-based compounds are uniformly dispersed in a large amount inside the melt pool 4. Since the fine AlFe-based compounds are uniformly and dispersed in a large amount, the distance between the AlFe-based compounds is 200 nm or less. Since the distance between the AlFe-based compounds is 200 nm or less, the movement of dislocations is efficiently inhibited, and good thermal stability is imparted to the aluminum alloy molded body 2. Further, though the coarse AlFe-based compound exhibits brittle properties and causes a decrease in toughness and ductility of the aluminum alloy molded body 2, when setting the average particle size of the AlFe-based compound to 100 nm or less, these adverse effects can be suppressed.

The average particle size of the AlFe-based compound is preferably 20 to 100 nm. Although there is a case that the AlFe-based compound may be coarsened in the boundary region of the melt pool 4, the target with respect to the "distance between the AlFe-based compounds" and the "average particle size of the AlFe-based compound" in the present specification is the AlFe-based compounds being present inside the melt pool 4, which occupies most of the aluminum alloy molded body 2.

The method for determining the distance and the average particle size of the AlFe-based compound is not particularly limited as long as the effect of the present invention is not impaired, and various conventionally known methods may be used for measurement. For example, the distance and the average particle size can be obtained by cutting the aluminum alloy molded body 2 at an arbitrary cross section, observing the obtained cross-sectional sample with a scanning electron microscope, and then calculating the average value of the distance and particle size of the AlFe-based compound inside the melt pool 4. Depending on the observation method, the cross-sectional sample may be subjected to mechanical polishing, buffing, electrolytic polishing, etching or the like.

(3) Physical Properties

In the aluminum alloy molded body 2 of the present invention, it is preferable that a thermal conductivity is 100 W/mK or more. In the aluminum alloy molded body 2 of the present invention, since Fe forms a fine AlFe-based compound, the amount of solid solution of Fe is reduced to increase the strength and thermal conductivity. In addition, the strain of the aluminum base material is significantly reduced in the process of forming the AlFe-based compound, and thus, the high thermal conductivity is realized by these effects.

The Vickers hardness at 200° C. of the aluminum alloy molded body 2 is preferably 60 HV or more. When having the Vickers hardness of 60 HV or more at 200° C., it can be suitably used for applications such as heat sink materials that are maintained at a high temperature. Here, more preferable hardness at 200° C. is 70 HV or more, and the most preferable hardness is 80 HV or more.

The tensile strength at room temperature of the aluminum alloy molded body 2 is preferably 240 MPa or more. More preferable tensile strength is 250 MPa or more, and the most preferable tensile strength is 260 MPa or more. Since extremely fine AlFe-based compounds are uniformly and widely dispersed, the aluminum alloy molded body 2 has high tensile properties. Since the aluminum alloy molded body 2 has these tensile properties, it can be suitably used in applications where strength and reliability are required.

2. Method for Producing the Aluminum Alloy Molded Body

The method for producing the aluminum alloy molded body includes the lamination molding step of using an aluminum alloy material containing 2 to 10% by mass of a transition metal element which forms a eutectic crystal with Al, with the remainder being Al and unavoidable impurities as a raw material to obtain an aluminum alloy laminated molded body by an additive manufacturing method; and the heat treatment step of precipitating a compound composed of Al and the transition metal element and reducing residual stress. Hereinafter, each step will be described in detail by showing a representative case where the transition metal element is Fe.

(1) Lamination Molding Step

The lamination molding step is a step of using an aluminum alloy material containing 2 to 10% by mass of Fe, with the remainder being Al and unavoidable impurities as a raw material and obtaining an aluminum alloy laminated molded body by an additive manufacturing method.

The additive manufacturing method is a method of stacking and processing melt-solidified regions one by one based on two-dimensional (slice) data obtained from 3D-CAD data. In the method for producing the aluminum alloy molded body of the present invention, for example, an aluminum alloy powder is used as a raw material, and the deposited metal powder is melt-solidified by irradiation with a laser or the like and laminated by one layer to give a three-dimensional molded body.

The additive manufacturing method is not particularly limited as long as the effect of the present invention is not impaired, and various conventionally known additive manufacturing methods can be used. Further, the heat source for melting the raw metal is not particularly limited as long as the effect of the present invention is not impaired, and various conventionally known heat sources can be used, and for example, a laser or an electron beam can be preferably used.

Here, since aluminum is difficult to absorb a laser and heat is easily diffused due to its high thermal conductivity, it is difficult to obtain an aluminum alloy molded body having a high density by the additive manufacturing method. Therefore, in order to increase the density of the aluminum alloy molded body 2, it is preferable to use a laser having a short wavelength, and for example, a Yb fiber laser can be suitably used.

(2) Heat Treatment Step

The heat treatment step is a step for heat-treating the aluminum alloy laminated molded body obtained by using the additive manufacturing method at an appropriate temperature to precipitate the AlFe-based compounds and to reduce residual stress.

When molding an aluminum alloy material containing 2 to 10% by mass of Fe by an additive manufacturing method, a quenched and solidified structure made of an aluminum base material in which the Fe is solid-dissolved is formed. After that, when maintaining the aluminum alloy laminated molded body at 200 to 400° C., it is possible to precipitate the AlFe-based compound further and to reduce the residual stress. The holding time may be appropriately adjusted according to the size and shape of the aluminum alloy laminated molded body, and is preferably 1 to 100 hours.

When setting the heat treatment temperature to 200° C. or higher, the fine AlFe-based compounds are sufficiently precipitated, and the distance between the AlFe-based compounds can be set to 200 nm or less. Further, when setting the heat treatment temperature to 400° C. or lower, it is possible to suppress coarsening of the AlFe-based compound and prevent reducing of mechanical properties such as Vickers hardness of the aluminum alloy molded body 2. The more preferable heat treatment temperature is 225 to 375° C., and the most preferable heat treatment temperature is 250 to 350° C.

Although the typical embodiments of the present invention have been described above, the present invention is not limited to these, and various design changes are possible, and all of these design changes are included in the technical scope of the present invention.

EXAMPLE

Example

An aluminum alloy molded body was obtained by using an aluminum alloy powder of a 50% particle size of 40 to 50 μm having a composition (% by mass) shown in TABLE 1 as a raw material by an additive manufacturing method of a powder bed melt-bonding method using a laser. The modeling machines used for lamination modeling are ProX320 available from 3D Systems and LUMEX Avance-25 available from Matsuura Machinery Co., Ltd. equipped with a Yb fiber laser.

TABLE 1

|  | Si | Fe | Al |
|---|---|---|---|
| Ex. 1 | 0.12 | 2.38 | Bal. |
| Ex. 2 | 0.11 | 4.81 | Bal. |
| Com. Ex. 1 | 0.06 | 0.10 | Bal. |
| Com. Ex. 2 | 0.12 | 1.10 | Bal. |

More specifically, the aluminum alloy molded body was obtained under the lamination conditions of laser output: 320 to 460 W, scanning speed: 700 to 1200 mm/s, scanning pitch: 0.10 to 0.18 mm, and atmosphere: inert gas.

Next, the obtained aluminum alloy molded body was held in the air at each temperature of 300° C., 350° C., 400° C., 450° C., 475° C., 500° C., 525° C., and 550° C. for 1 hour.

[Evaluation Test]
(1) Microstructure
A sample for cross-section observation was cut out from the obtained aluminum alloy molded body and subjected to mirror polishing to prepare a sample for structure observation. An optical microscope and a scanning electron microscope (ULTRA Plus type, available from Carl Zeiss) were used for the observation, and the macrostructure of the cross section and the AlFe-based compound dispersed in the melt pool were observed.

(2) Vickers Hardness Measurement
A cross-sectional sample was prepared in the same manner as in (1), and the Vickers hardness was measured. The measurement was performed with a measured load of 5 kgf and a holding time of 15 s. In addition, the high temperature Vickers hardness at each temperature of 200° C., 250° C., 300° C. and 350° C. was also measured. The high temperature Vickers hardness was measured by using HTM-1200II type (indenter material: sapphire) available from INTESCO, and the measured load was 1000 to 3000 gf and the holding time was 30 seconds. The temperature rising rate of the sample was set to 10° C./min and the measurement was started after holding the sample for 5 minutes after reaching the temperature.

(3) Tensile Test
A No. 14A test piece defined in JIS-Z2241 was collected from the obtained aluminum alloy molded body and subjected to a tensile test at room temperature. The crosshead speed during the tensile test was 0.1 to 0.5 mm/min up to 0.2% proof stress, and 5 mm/min after 0.2% proof stress. In addition, the tensile properties at each temperatures of 200° C., 250° C., 300° C. and 350° C. were also evaluated. In the tensile test at a high temperature, the tensile test piece was held at each measurement temperature for 100 hours and then subjected to the tensile test.

(4) Thermal Conductivity
The thermal conductivity was measured by the laser flash method by using a thermal conductivity measuring device (thermal constant measuring device TC-9000 type, available from Albac Riko). The test piece for measuring thermal conductivity was φ10 mm, and both sides of the disk were polished to a thickness of about 2 mm.

Comparative Example

An aluminum alloy molded body was obtained in the same manner as in Examples except that the aluminum alloy powder having the compositions shown in Comparative Example 1 and Comparative Example 2 in TABLE 1 was used as a raw material. Further, the heat treatment was performed in the same manner as in Example, and the obtained aluminum alloy molded body was evaluated in the same manner as in Example.

Figure 2:
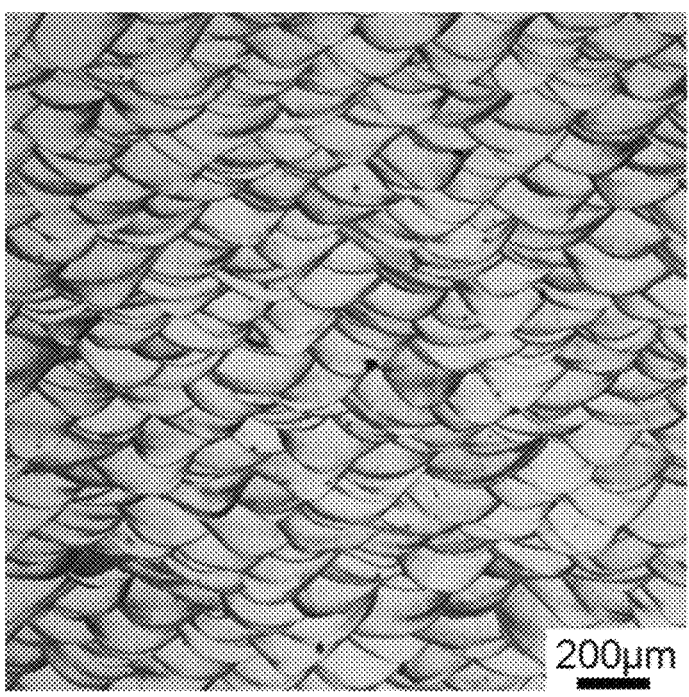
FIG. 2 is a cross-section macro observation result of the aluminum alloy molded body (as is laminated) of Example 1.
Figure 3:
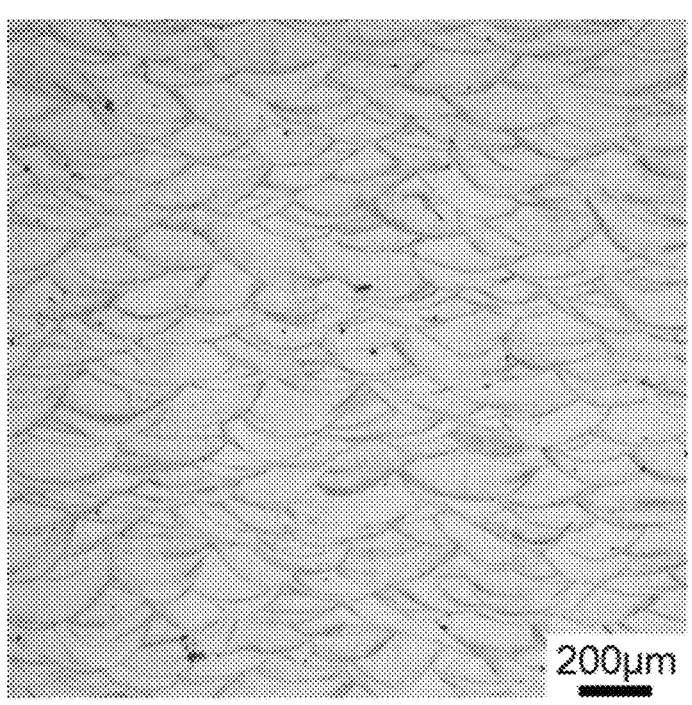
FIG. 3 is a cross-sectional macro observation result of the aluminum alloy molded body (as is laminated) of Comparative Example 2.

The cross-sectional macro photographs of the aluminum alloy molded bodies of Example 1 and Comparative Example 2 (as they are laminated) are shown in FIG. 2 and FIG. 3, respectively. It can be seen that each aluminum alloy molded body is formed by joining a large number of melt pools. In addition, no significant defects were observed, and it can be confirmed that a dense aluminum alloy molded body was obtained.

Figure 4:
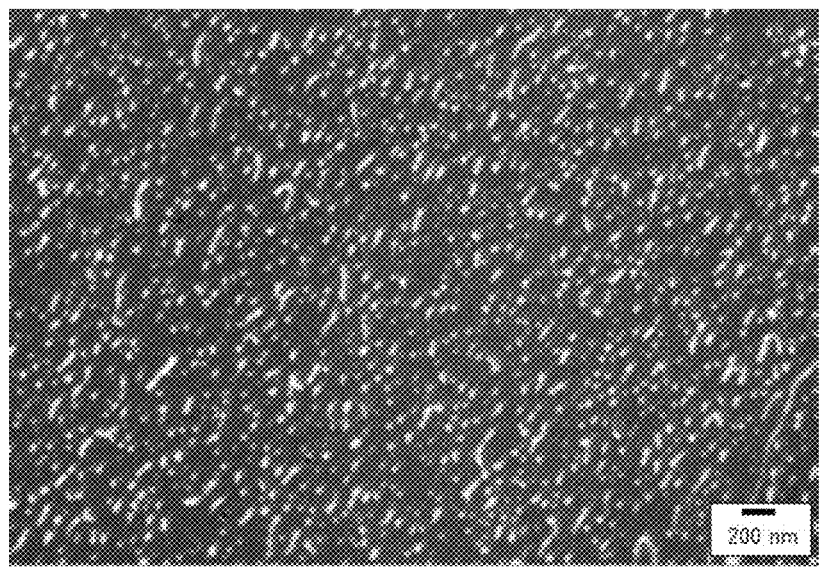
FIG. 4 is the SEM observation result in the melt pool of the aluminum alloy molded body (as is laminated) of Example 1.
Figure 5:
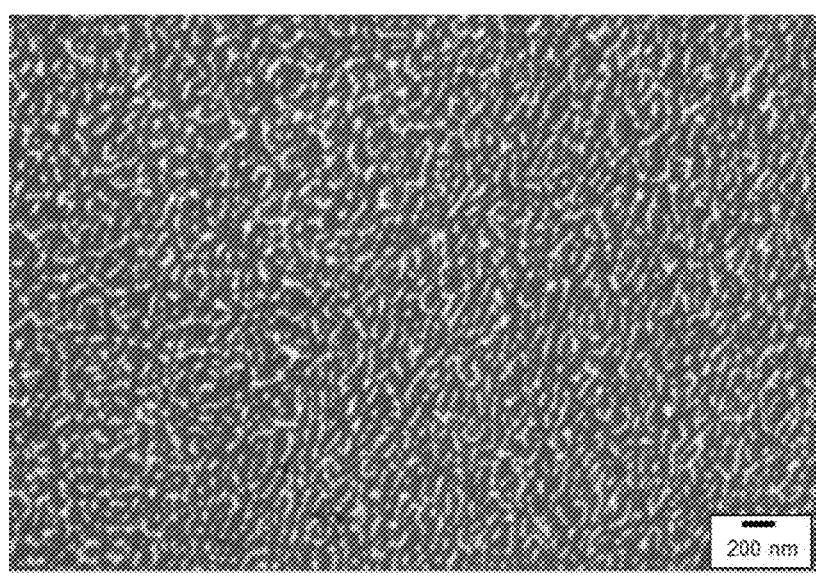
FIG. 5 is the SEM observation result in the melt pool of the aluminum alloy molded body (as is laminated) of Example 2.

The observation results of the AlFe-based compound in the melt pool of the aluminum alloy molded bodies of Example 1 and Example 2 (as they are laminated) are shown in FIG. 4 and FIG. 5, respectively. In each aluminum alloy molded body, extremely fine AlFe-based compounds are uniformly dispersed in a large amount, and the distance between the AlFe-based compounds is 200 nm or less.

The thermal conductivity and Vickers hardness of the aluminum alloy molded bodies of Example 1, Example 2, Comparative Example 1 and Comparative Example 2 are shown TABLE 2. The aluminum alloy molded body of Example 1 has a higher Vickers hardness than the aluminum alloy formed bodies of Comparative Example 1 and Comparative Example 2 because fine AlFe-based compounds are uniformly dispersed in a large amount. Further, when the heat treatment temperature is 300 to 400° C., the hardness is increased in comparison with that of the body just after the laminated molding, and when the heat treatment temperatures are 500° C. and 550° C., the hardness is 50 HV or more. In addition, the thermal conductivity of the aluminum alloy molded body of Example 1 is 170 W/mK or more by the heat treatment. Furthermore, the aluminum alloy molded body of Example 2 has a high Vickers hardness even at a high temperature, and also has a thermal conductivity of 100 W/mK or more.

TABLE 2

| | Heat treating conditions | Thermal conductibity (W/mK) | Vickers hardness (HV) |
|---|---|---|---|
| Ex. 1 | as-built | 149 | 79.4 |
| | 300° C. × 1 h | — | 88.6 |
| | 350° C. × 1 h | 179 | 84.1 |
| | 400° C. × 1 h | 192 | 80.2 |
| | 450° C. × 1 h | 195 | 67.2 |
| | 500° C. × 1 h | 198 | 58.3 |
| | 550° C. × 1 h | — | 52.0 |

TABLE 2-continued

| | Heat treating conditions | Thermal conductibity (W/mK) | Vickers hardness (HV) |
|---|---|---|---|
| Ex. 2 | as-built | 126 | 112.2 |
| | 300° C. × 1 h | 132 | 131.6 |
| | 350° C. × 1 h | 148 | 126.2 |
| | 400° C. × 1 h | 158 | 109.9 |
| | 450° C. × 1 h | 179 | 83.2 |
| | 500° C. × 1 h | 187 | 72.0 |
| | 550° C. × 1 h | 189 | 65.5 |
| Com. Ex. 1 | as-built | 214 | 34.5 |
| | 350° C. × 1 h | 217 | 33.6 |
| | 450° C. × 1 h | 225 | 32.0 |
| | 475° C. × 1 h | 224 | 30.4 |
| | 500° C. × 1 h | 224 | 29.6 |
| | 525° C. × 1 h | 225 | 29.2 |
| Com. Ex. 2 | as-built | 172 | 60.3 |
| | 300° C. × 1 h | — | 63.9 |
| | 350° C. × 1 h | 198 | 62.4 |
| | 400° C. × 1 h | 202 | 59.2 |
| | 450° C. × 1 h | 204 | 52.9 |
| | 500° C. × 1 h | 209 | 47.0 |
| | 550° C. × 1 h | — | 42.4 |

The high temperature Vickers hardness of the aluminum alloy molded bodies of Example 1, Example 2, and Comparative Example 2 are shown in TABLE 3. The aluminum alloy molded bodies of Examples 1 and Example 2 maintain high Vickers hardness even when kept at a high temperature, and are 60 HV or more at 200° C. and 55 HV or more at 250° C. On the other hand, the hardness of the aluminum alloy molded body of Comparative Example 2 is remarkably lowered at a high temperature.

TABLE 3

| | Measuring Temperature (° C.) | | | | |
|---|---|---|---|---|---|
| | 20 (room temp.) | 200 | 250 | 300 | 350 |
| Ex. 1 | 79.4 | 68.0 | 58.6 | 43.0 | 28.9 |
| Ex. 2 | 112.2 | 96.4 | 86.0 | — | 51.4 |
| Com. Ex. 2 | 60.3 | 48.7 | 43.3 | 28.3 | 18.3 |

The tensile properties of the aluminum alloy molded bodies of Example 1, Example 2 and Comparative Example 2 (as they are laminated) are shown in TABLE 4. Each of the aluminum alloy molded bodies obtained in Examples has high tensile strength and proof stress. The relative densities of the aluminum molded bodies are Example 1: 98.9%, Example 2: 99.8%, and Comparative Example 2: 98.8%.

TABLE 4

| | Tensile strength (MPa) | 0.2% Proof stress (MPa) | Elongation (%) |
|---|---|---|---|
| Ex. 1 | 265.0 | 222.0 | 5.1 |
| Ex. 2 | 422.0 | 355.0 | 2.3 |
| Com. Ex. 2 | 195.0 | 166.0 | 9.7 |

The tensile properties of the aluminum alloy molded bodies of Example 1, Example 2 and Comparative Example 2 (as they are laminated) at high temperatures are shown in TABLE 5. It can be seen that the aluminum alloy molded bodies obtained in Examples have high tensile strength and proof stress even at high temperatures. At 250° C. and 300° C. in Example 2, since the elongation was small, an accurate 0.2% proof stress could not be calculated.

TABLE 5

| | Measuring temp. (° C.) | Tensile strength (MPa) | 0.2% Proof stress (MPa) | Elongation (%) |
|---|---|---|---|---|
| Ex. 1 | 200 | 208.0 | 189.0 | 2.9 |
| | 250 | 182.0 | 171.0 | 3.2 |
| | 300 | 131.0 | 121.0 | 1.6 |
| Ex. 2 | 200 | 308.0 | 287.0 | 1.4 |
| | 250 | 254.0 | — | 1.4 |
| | 300 | 188.0 | — | 1.5 |
| | 350 | 101.0 | 90.0 | 2.3 |
| Com. Ex. 2 | 200 | 145.0 | 127.0 | 5.6 |
| | 250 | 127.0 | 114.0 | 6.9 |
| | 300 | 94.0 | 78.0 | 5.0 |
| | 350 | 67.0 | 46.0 | 7.5 |

Figure 6:
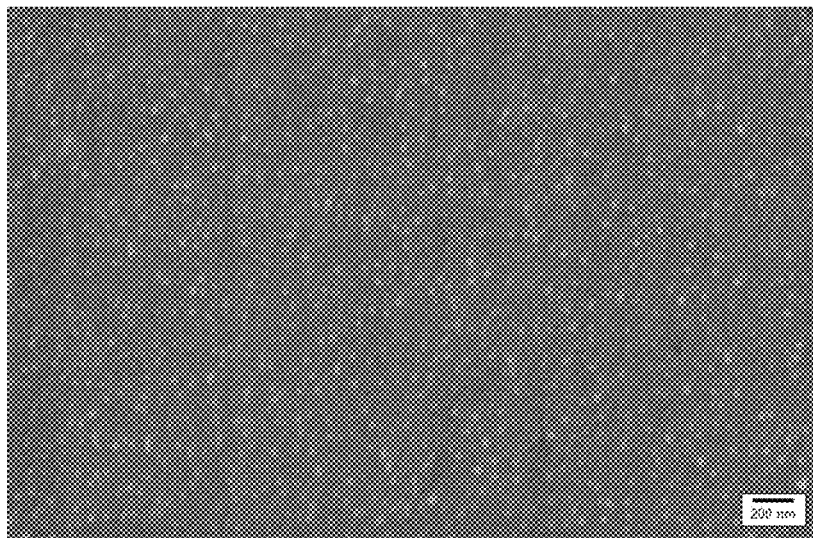
FIG. 6 is the SEM observation result in the melt pool after heat-treating the aluminum alloy molded body obtained in Example 1 at 200° C. for 100 hours.

The observation results of the AlFe-based compound inside the melt pool after holding at 200° C. for 100 hours with respect to the aluminum alloy molded body (as laminated) obtained in Example 1 is shown in FIG. 6. The AlFe-based compound maintains a fine state (average particle size: 20 to 100 nm) even after heat treatment at a high temperature for a long time, and the distance between the AlFe-based compounds is 200 nm or less.

EXPLANATION OF SYMBOLS

2 . . . Aluminum alloy molded body,
4 . . . Melt pool.

The invention claimed is:

1. An aluminum alloy molded body, which is an aluminum alloy laminated molded body molded by an additive manufacturing method, which is characterized in that:
   a raw material therefor is an aluminum alloy material consisting of 2 to 10% by mass of a transition metal element that forms a eutectic crystal with Al, the remainder of Al and unavoidable impurities, the transition metal element being one or more selected from a group consisting of Fe, Ni and Co;
   a relative density thereof is 98.5% or more;
   a metal structure is composed of a primary crystal α (Al) and compounds each composed of Al and the transition metal element;
   the compounds in a region excluding a boundary of a region formed by solidifying a melt pool formed during the additive manufacturing method are spaced apart from each other at a distance of 200 nm or less, and
   the aluminum alloy molded body does not contain a rare earth element.

2. The aluminum alloy molded body according to claim 1, wherein
   the transition metal element is Fe and
   each one of the compounds is an AlFe-based compound.

3. The aluminum alloy molded body according to claim 1, wherein the Vickers hardness at 200° C. is 60 HV or more.

4. The aluminum alloy molded body according to claim 1, wherein the tensile strength at room temperature is 240 MPa or more.

5. A method for producing the aluminum alloy molded body according to claim 1, which is characterized by comprising,
   a lamination molding step of molding the aluminum alloy material consisting of 2 to 10% by mass of the transition metal element which forms the eutectic crystal with Al, the remainder of Al and unavoidable impurities by the additive manufacturing method to obtain the aluminum alloy laminated molded body; and a heat treatment step of holding the aluminum alloy laminated molded body at 200 to 400° C. to precipitate the compounds each composed of Al and the transition metal element and to reduce residual stress.

6. The method for producing an aluminum alloy molded body according to claim 5, wherein the transition metal element is Fe, and each one of the compounds is an AlFe-based compound.

7. The aluminum alloy molded body according to claim 1, wherein the unavoidable impurities are at least one selected from a group consisting of Si, Cu, Mn, Mg, Zn, Cr and Ti.

* * * * *